UNITED STATES PATENT OFFICE.

ELIZABETH FOSTER O'NEAL, OF PHILADELPHIA, PENNSYLVANIA.

WASHING-POWDER.

SPECIFICATION forming part of Letters Patent No. 483,634, dated October 4, 1892.

Application filed October 7, 1891. Serial No. 408,016. (No specimens.)

*To all whom it may concern:*

Be it known that I, ELIZABETH FOSTER O'NEAL, a citizen of the United States, residing in the city and county of Philadelphia, State of Pennsylvania, have invented a new and useful Improvement in Washing-Powders, which improvement is fully set forth in the following specification.

My invention relates to improvements in washing-powders for fabrics, &c.; and it consists of a composition composed of the ingredients hereinafter set forth.

In making my improved washing-powder I combine or mix the following-named ingredients in about the accompanying proportions, viz: sixty parts of borax, twenty parts of washing-soda, ten parts of pearlash, six parts of salt of tartar formed of acid tartrate of potassium, five parts of oxalic acid, and one-half part of soluble washing-blue.

The various ingredients are thoroughly pulverized or reduced to powder before mixing them together in a suitable vessel. The mixture forms a granular composition of a grayish appearance, producing a washing-powder for fabrics which, while loosening or removing the dirt therefrom, does not act with any deleterious effect upon the fabric itself. It also has little or no effect upon what are known as "ordinary" dyes, thus leaving the coloring-matter of colored goods, as ginghams, &c., unimpaired.

The proportions described, which are by measure or quantity, are substantially adhered to in manufacturing the powder, though a slight departure from the exact proportions named may be had without impairing the efficiency of the composition.

In using the washing-powder, which is preferably kept in paper packages and in boxes, about a table-spoonful thereof is placed in boiling water in an ordinary stove-boiler or other suitable vessel or receptacle. The fabrics to be washed, having previously been soaped and immersed in cold water, are now placed in the boiling water, and after remaining therein for about five minutes are removed therefrom and wrung out, so as to remove the suds, when they are replaced in the vessel for further boiling.

No scrubbing or pounding of the goods is necessary, thus saving the wear and tear resulting from such action.

Ink-stains, grease, and varnish can readily be removed from fabrics or garments by an application of the powder in boiling water, thus making it extremely valuable in renovating soiled clothing.

Having thus described my invention, what I claim as new, and desire to secure by Letters Patent, is—

1. A washing-powder composed of borax, soda, pearlash, salts of tartar, oxalic acid, and soluble blue, substantially as described.

2. A washing-powder composed of borax, soda, pearlash, salts of tartar, oxalic acid, and soluble blue, and in the proportions substantially as described.

3. A washing-powder in granular form, composed of borax, soda, pearlash, salts of tartar, oxalic acid, and soluble blue, substantially as described.

ELIZABETH FOSTER O'NEAL.

Witnesses:
JOHN A. WIEDERSHEIM,
A. P. JENNINGS.